United States Patent [19]
Carlin

[11] 3,882,940
[45] May 13, 1975

[54] TERTIARY OIL RECOVERY PROCESS INVOLVING MULTIPLE CYCLES OF GAS-WATER INJECTION AFTER SURFACTANT FLOOD

[75] Inventor: Joseph T. Carlin, Houston, Tex.

[73] Assignee: Texaco Inc., New York, N.Y.

[22] Filed: Dec. 17, 1973

[21] Appl. No.: 425,593

[52] U.S. Cl................................. 166/273; 166/274
[51] Int. Cl........................................... E21b 43/22
[58] Field of Search ............ 166/273, 274, 270, 252

[56] References Cited
UNITED STATES PATENTS

| | | | |
|---|---|---|---|
| 3,244,228 | 4/1966 | Parrish | 166/273 |
| 3,386,506 | 6/1968 | Quance | 166/273 |
| 3,472,320 | 10/1969 | Dyes | 166/273 |
| 3,529,668 | 9/1970 | Bernard | 166/273 |
| 3,586,107 | 6/1971 | Parrish | 166/273 |
| 3,599,715 | 8/1971 | Roszelle | 166/273 |
| 3,599,716 | 8/1971 | Thompson | 166/273 |
| 3,599,717 | 8/1971 | McMillen | 166/273 |
| 3,648,772 | 3/1972 | Earlougher, Jr. | 166/273 |
| 3,653,440 | 4/1972 | Reisberg | 166/273 |

Primary Examiner—Stephen J. Novosad
Attorney, Agent, or Firm—T. H. Whaley; C. G. Ries; Jack H. Park

[57] ABSTRACT

The oil recovery efficiency of a tertiary oil recovery process such as a surfactant flood is improved by injecting after the surfactant solution alternating cycles of water and small volume slugs of a gas such as air, nitrogen, carbon dioxide, flue or exhaust gas, natural gas, methane, ethane, propane, butane, liquefied petroleum gas and mixtures thereof.

9 Claims, 1 Drawing Figure

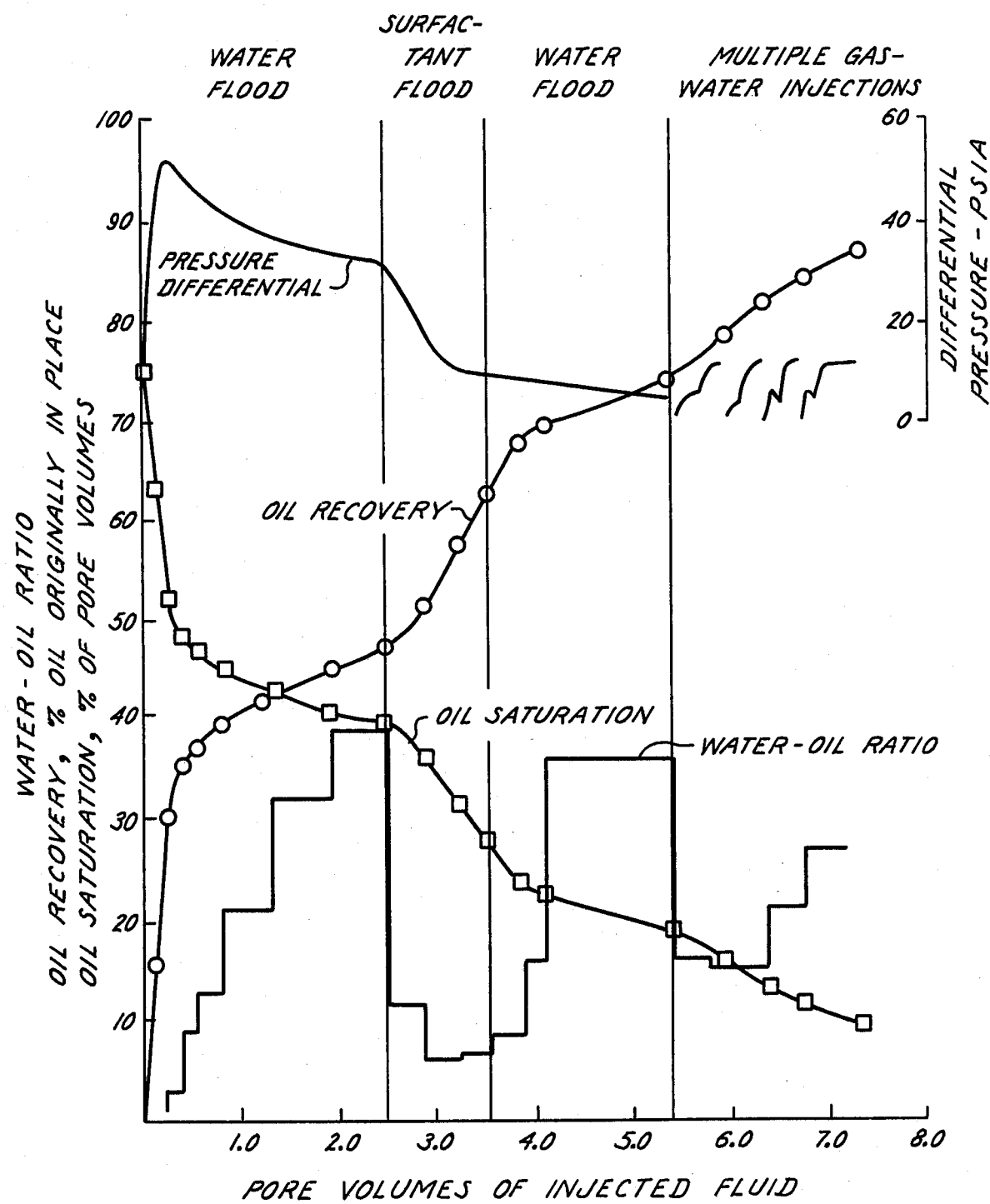

TERTIARY OIL RECOVERY PROCESS INVOLVING MULTIPLE CYCLES OF GAS-WATER INJECTION AFTER SURFACTANT FLOOD

BACKGROUND OF THE INVENTION

1. Field of the Invention

This invention pertains to an oil recovery process and more particularly to a process for tertiary oil recovery. Still more particularly this invention is concerned with a method of treating an oil containing formation after the formation has been subjected to chemical tertiary oil recovery treatment such as surfactant flooding so as to recover additional oil therefrom.

2. Background and Prior Art

Petroleum is normally recovered from subterranean formations in which it has accumulated by penetrating said formation with one or more wells and pumping or permitting the petroleum to flow to the surface through these wells. Recovery of petroleum from petroleum containing formations is possible only if certain conditions are satisfied. There must be an adequately high concentration of petroleum in the formation, and there must be sufficient porosity and permeability or interconnected flow channel throughout the formation to permit the flow of fluids therethrough if sufficient pressure is applied to the fluid. When the subterranean petroleum containing formation has natural energy present in the form of an underlying active water drive, or gas dissolved in the petroleum, or a high pressure gas cap above the petroleum within the petroleum reservoir, this natural energy is utilized to recover petroleum. Recovery of petroleum by utilization of natural energy is referred to as primary recovery. When this natural energy source is depleted, or in the instance of those formations which do not originally contain sufficient natural energy to permit primary recovery operations, some form of supplemental recovery process must be utilized in order to extract petroleum from the subterranean petroleum containing formation. Supplemental recovery is frequently referred to as secondary recovery, although in fact it may be primary, secondary or tertiary in sequence of employment.

Water flooding, which involves the injection of water into the subterranean, petroliferous formation for the purpose of displacing petroleum toward the producing well, is the most economical and most widely practiced supplemental recovery method. Water does not displace petroleum with high efficiency, however, since water and oil are immiscible, and also because the interfacial tension between water and oil is quite high. Persons skilled in the art of oil recovery have recognized this weakness of waterflooding and many additives have been described in the prior art for decreasing the interfacial tension between the injected water and the formation petroleum. For example, U.S. Pat. No. 2,233,381 (1941) disclosed the use of polyglycol ether as a surface active agent or surfactant to increase the capillary displacement efficiency of an aqueous flooding medium. U.S. Pat. No. 3,302,713 discloses the use of petroleum sulfonate prepared from the 850° to 1050°F. boiling range fraction of petroleum crude as a surfactant for use in oil recovery operations. U.S. Pat. No. 3,468,377 (1969) describes the use of petroleum sulfonates of a specified molecular weight for oil recovery. Other surfactants which have been proposed for oil recovery include alkylpyridinium salts, alkyl sulfates, alkyl sulfonates, alkylaryl sulfonates and quaternary ammonium salts. Special surfactants or combinations of two or more dissimilar surfactants are sometimes required for use in formations having unusual properties such as formation water containing intolerably high concentrations of salt or polyvalent ions such as calcium or magnesium.

The cost of surfactants and other additives such as viscosity increasing polymers for drive fluids used in supplemental recovery is quite high, however, and the amount of additional oil recovered as a consequence of using surfactants has frequently not been sufficient to justify the use of chemical tertiary recovery on a commercial basis, even though there is a substantial need for the additional oil recoverable thereby.

In view of the foregoing, it can be appreciated that there is a substantial need for a method for increasing the volume of additional oil recovered by surfactant flooding without increasing the cost of the supplemental recovery process appreciably.

SUMMARY OF THE INVENTION

This invention pertains to a novel process to be applied to a subterranean, petroleum containing formation which normally will already have been subjected to primary recovery and possibly waterflooding. The process is an additional step to be performed after subjecting the formation to chemical tertiary or supplemental oil recovery process such as flooding with a surfactant solution or a micellar dispersion. I have discovered that by injecting at least one and preferably several slugs of a gaseous substance into the formation after the chemical displacing fluid has been injected, substantial additional oil may be recovered. From 1 to 15 and preferably from 2 to 6 discrete slugs of gas, each gas slug being from 1/10 to 10 pore volume percent and preferably from 2 to 8 pore volume percent in size, with water slugs of from 10 to 50 pore volume percent interposed therebetween, are used after the chemical flood. Gaseous materials suitable for use in this process include air, nitrogen, carbon dioxide, flue gas, exhaust gas, methane, ethane, propane, butane, natural gas, liquefied petroleum gas (LPG) and mixtures thereof. My invention, therefor, comprises the process of using small, alternating gas and water slugs after a chemical flood such as an aqueous surfactant containing fluid.

BRIEF DESCRIPTION OF THE DRAWING

The attached FIGURE illustrates the graphical results of a typical laboratory core displacement test, showing the pressure differential, percent oil recovery, residual oil saturation and water-oil ratio for a conventional waterflood followed by a surfactant flood followed by water injection followed by four cycles of gas-water injection.

DETAIL DESCRIPTION OF THE PREFERRED EMBODIMENTS

Briefly, the process of my invention concerns an improvement in surfactant flooding. Surfactant flooding has been recognized by persons skilled in the art as a means for obtaining additional oil from an oil containing formation beyond that recoverable by primary recovery and waterflooding. For purposes of clarity, the following explanation of surfactants and surfactant flooding provides a basis for understanding the prior art process with which my invention is to be used.

The term surfactant encompasses a broad spectrum of materials which share the following common characteristics:

1. The compound must be at least slightly soluble in at least one phase of the liquid system in which it is to be used.
2. The compound must have an amphipathic structure (the molecule is composed of groups with opposing solubility tendencies). For use in oil recovery operations, the molecule must have at least one hydrophobic or oil soluble group and at least one hydrophilic or water soluble group.
3. Surfactant molecules or ions tend to form oriented monolayers at phase interfaces.
4. The equilibrium concentration of the surfactant in any particular solute is greater at the phase interface than the concentration of the surfactant in the bulk of the solution.
5. The materials tend to form micelles or aggregates of molecules or ions whenever the concentration exceeds a certain limiting value which is a characteristic of the particular surfactant and solute.
6. The material must exhibit some combination of the following functional properties: detergency, foaming, wetting, emulsifying, solubilizing and dispersing.

Surfactants are generally classified in the literature on the basis of the type of hydrophilic or water soluble group or groups attached to the molecule, generally being classified as anionic, cationic or nonionic, as described below more fully.

1. Anionic surfactants are those surfactant materials wherein the hydrophilic or water soluble group is a carboxylate, sulfonate, sulfate or phosphate group. This is the most important class of surfactants generally and as applied to oil recovery. Anionic surfactants are readily available, inexpensive, and have a high degree of surface activity. Petroleum recovery operations will generally involve the use of anionic surfactants unless there is some objection to the use of anionic surfactants, or some sufficient reason to resort to the use of some other compound. Petroleum sulfonates are currently very popular anionic surfactants for oil recovery, and are prepared by isolating a preselected boiling range fraction of a crude oil and subjecting it to sulfonation. Petroleum sulfonates are desirable for use in oil recovery because of their effectiveness and low unit cost. Petroleum sulfonates do have certain limitations, however, notably their ineffectiveness in formations containing saline (high salt containing) or hard water (water having dissolved therein excessive quantities of polyvalent ions such as calcium and/or magnesium).
2. Cationic surfactants employ primary, secondary, or tertiary amines, or quaternary ammonium groups, as the hydrophilic or water soluble group.
3. Nonionic surfactants are materials which have no charge when the material is dissolved in an aqueous medium. The hydrophilic tendency is derived from oxygen atoms in the molecule which hydrate by hydrogen bonding to water molecules present in the solute. The strongest hydrophilic moiety in this class of surfactants is the ether linkage, and there must be a plurality of these linkages to render the compounds sufficiently water soluble to permit the compound to exhibit surface activity. Polyoxyethylene surfactants having the following recurring ether linkages are examples of hydrophilic moieties for nonionic surfactants:

$$- CH_2 - CH_2 - O - CH_2 - CH_2 - O -$$

A nonionic surfactant molecule may have more than one chain containing ether linkages and generally as much as 60 to 70 percent by weight of the molecule must be in the form of ether linkage containing chains in order to render the molecule sufficiently water soluble for it to function as a surfactant. It can be readily seen that the presence of these large chains containing the ether linkages in addition to the relatively long aliphatic or other hydrophobic chains results in a high molecular weight compound, and this is one reason that nonionic surfactants have low surface activity per unit weight of material. Nonionic surfactants are seldom used alone in oil recovery applications, although they are frequently employed in combination with another surfactant material, generally an anionic material such as petroleum sulfonate or an alkylbenzene sulfonate, for the purpose of increasing the surfactant's tolerance to salt or hard water.

Conventional practices today by persons skilled in the art of surfactant flooding involve the use of a multiplicity of steps only one of which may employ injecting a surfactant solution into the formation. The sequence may include injecting the following materials into the formation, generally in the order listed.

1. Usually water will have been injected to displace additional oil after primary recovery until the water-to-oil ratio of the produced fluid becomes so high that further production is uneconomical.
2. A preflush may be used to remove or displace water soluble materials present in the formation water which interfere with the surfactant material to be used. Sacrificial compounds such as sodium carbonate, sodium polyphosphate, sodium fluoride, etc., may also be present in the preflush to saturate the adsorption sites of the formation rock so as to minimize adsorption thereon of the subsequently injected surfactant. This slug may be followed by an isolation slug of water.
3. The main displacing fluid is injected next, which may be an aqueous solution of one or several surfactants capable of reducing the interfacial tension between the formation petroleum and the injected aqueous fluids. The displacing fluid may also be an emulsion of a hydrocarbon in an aqueous surfactant solution.
4. A mobility buffer fluid is generally introduced into the formation subsequent to the surfactant solution to displace the solution efficiently. A small isolation slug of water is sometimes used between the surfactant solution and the mobility buffer fluid. The mobility buffer fluid is needed to ensure efficient displacement of surfactant solution and formation petroleum which has been displaced by the surfactant solution because the mobility of the petroleum is less than the mobility of water. Usually a dilute aqueous solution of a hydrophilic polymer such as polyacrylamide or a polysaccharide is used for this purpose. The concentration of polymer may be reduced gradually with time, or "tapered," to essentially pure field water.
5. Water injection is continued until the water-oil ratio rises to an economically intolerable level.

By use of tertiary recovery programs such as are described above the percent oil recovery may often be increased by 10 to 20 percentage points, i.e., typically from 45 to 65 percent recovery, which may amount to millions of barrels of oil in a large field. Unfortunately the cost of the materials is frequently so great that such a program is not economically viable even though it is technically successful.

My discovery concerns an additional treatment step to be performed after completion of the surfactant fluid injection step described above. The additional treatment involves the injection of a plurality of small discrete slugs of a gaseous material separated by injecting small slugs of liquid, preferably water or other aqueous fluids.

The volume of gas in each slug can be from 0.20 to 20 pore volume percent and usually the optimum size is from 2 to 10 pore volume percent. The size of the water slug interposed between each gas slug injected can be from about 5 to about 50 pore volume percent, and preferably from about 10 to about 20 pore volume percent. The number of discrete gas slugs injected can be from about 1 to about 20 and is preferably from about 2 to about 8 slugs.

Any material at least a portion of which will remain in the gaseous phase at the temperature and pressure of the formation may be used. Air, nitrogen, carbon dioxide, normally gaseous paraffinic hydrocarbons such as methane, ethane, propane or butane as well as normally gaseous olefinic hydrocarbons such as ethylene, propylene or butylene and mixtures thereof are preferred gases for use in my invention. Crude gases such as exhaust gas or flue gas, which are predominantly carbon dioxide and nitrogen, as well as natural gas or liquefied petroleum gas (LPG) may also be used with excellent results. Mixtures of any two or more of these materials may be used although care must be exercised if a mixture of air or other oxygen containing gas and a combustable gas are to be used.

Certain of the above gases are somewhat soluble in petroleum. For example, carbon dioxide and the paraffinic hydrocarbons such as methane, ethane, etc., or the olefinic gases are quite soluble to varying degrees in petroleum. This is beneficial to the operation of my process since dissolution of these gases results in reduction in the viscosity of the petroleum; however, the solubility must be taken into consideration when determining the gas slug size. By increasing the slug size so that more gas than will dissolve in petroleum is injected, at least a part of the injected petroleum soluble gases will remain in the form of discrete, gaseous phase slugs in the formation. By this means, both the benefit of the process of my invention and of petroleum viscosity reduction by gas dissolution therein can be achieved simultaneously.

Gas injection has been described in the literature for petroleum recovery; however, it is recognized by persons skilled in the art that gas displaces petroleum in a very inefficient manner because the viscosity of gas is very much less than the viscosity of petroleum. The process of my invention differs considerably from gas displacement as taught by the prior art.

The mechanism responsible for the benefit resulting in employment is not fully understood. It is likely that the alternating gas-water slugs generate substantial mixing action in the formation, which aids in emulsification of oil or otherwise causes additional oil to move into the moving fluid stream. Also, gas appears to desorb surfactant from formation rock to a degree, making more surfactant available for oil displacement. The tendency of multiple gas slugs to desorb adsorbed surfactant from the formation matrix makes possible the use of substantially lower surfactant concentrations and/or smaller slugs of surfactant solutions in certain situations. It is not my intention to represent that these are necessarily the only mechanisms responsible for the benefits resulting from application of my invention, however.

In a slightly different embodiment of the process of my invention, the gas and water may be injected simultaneously after completion of injection of the surfactant solution into the formation. The volume ratio of gas and water being injected should be from about 0.002 to about 1.5 and preferably from about 0.5 to about 1.0. Some precaution should be taken to avoid excess vertical stratification of the gas and water, gas going exclusively into the top portion of the formation and water moving exclusively into the bottom portion, because of the large differences in density between water and gas. Such density related vertical separation can be prevented, for example, by providing two separate injection strings and injecting gas into the bottom of the formation and water into the top of the formation. This arrangement also permits separate control of the injection rate of each material to maintain the desired ratio of gas and water.

FIELD EXAMPLE

In order to better understand the method of applying the process of my invention, the following pilot field example is provided. This is merely one illustrative embodiment of my invention, however, and it is not intended to be limitative or restrictive thereof.

A subterranean, petroleum containing formation is found at a depth of 8000 feet. The formation is 40 feet thick and the porosity is 30 percent. The field is exploited first by primary production, utilizing a square grid pattern with 400 foot line spacing between wells. At the conclusion of primary recovery, which recovers only 25 percent of the original petroleum in place within the reservoir, injection wells are drilled in the center of each square grid to convert the field to an inverted five spot pattern for water injection. Although a large field entails a multiplicity of the square grid patterns, each 400 feet on a side and with an injection well in the center, it is possible to analyze the entire field by considering only a single grid unit. Water is injected into the injection well and production of oil is continued from the production wells until the water/oil ratio reaches 30, which is considered to be the economic limit for continued production. At the conclusion of the water flooding operation, only 45 percent of the original oil in place in the reservoir has been recovered and the average residual oil saturation is 33 percent. Some form of tertiary recovery operation must be employed in order to obtain any significant portion of the remaining petroleum. The formation water contains about 300 parts per million total hardness and low salinity, and tests indicate that petroleum sulfonate will function effectively therein. A tertiary chemical supplemental recovery program is designed using a 10 pore volume percent preflush comprising a 5 percent aqueous solution of sodium carbonate as a sacrificial adsorption agent followed by a 3 pore volume percent water slug to act as an isolation slug between the preflush and the surfactant slug. A 10 pore volume percent slug of 3.5 percent petroleum sulfonate is used as the surfactant slug. Since the pattern used results in 70 percent sweep efficiency, the total pore volume swept by injected fluids in each grid segment is: 400 Ft. × 400 Ft.

× 40 Ft. × 0.30 × 0.70 = 1,344,000 Cu. Ft. A 10 percent pore volume slug of surfactant solution, which amounts to 134,400 cu. ft. or 1,047,000 gallons, is used. The 1,047,000 gallons of 3.5 percent petroleum sulfonate surfactant solution is followed by injecting 1,000,000 gallons of an aqueous solution comprising 200 parts per million of polyacrylamide, a hydrophilic polymer in water, the solution having a viscosity of 8 centipoise. Finally, a 20 pore volume percent slug of water is injected, followed by five cycles of alternating gas-water injection. Each cycle consists of injecting a 5 pore volume percent slug of natural gas which is 95 percent methane and the balance ethane and propane. Ten pore volume percent slugs of water follow each 5 pore volume percent slug of natural gas. After the fifth cycle of alternating gas-water injection, continuous water injection is begun to displace all of the injected fluids through the formation and continued until the water-oil ratio of all of the wells has risen to a value above about 35. At the conclusion of the combined chemical-gas-water tertiary recovery program the average residual oil saturation is only 6 percent.

EXPERIMENTAL

In order to demonstrate the operability of my invention and to determine the optimum values for control parameters for the process of my invention, as well as to ascertain the magnitude of additional oil recovery resulting from employment thereof, the following experimental laboratory work was done.

A linear core taken from the Slaughter Field, Hockley County, Texas was evaluated for chemical tertiary recovery. Because the formation water is high in calcium and magnesium content, a special surfactant combination consisting of a linear alkylbenzene sulfonate anionic surfactant and a polyethoxylated nonlyphenol nonionic surfactant was determined to be the optimum surfactant for use. The results of Run A, a core displacement test, is graphically illustrated in the attached figure, showing percent oil recovery, residual oil recovery, water-oil ratio of the produced fluid, and the differential pressure across the core, all as a function of the pore volumes of fluid injected into the core. As can be seen, a waterflood using 2.5 pore volumes of a mixture of 20 percent Slaughter Formation Connate Water followed by a surfactant flood using 1 pore volume of 0.4 percent linear alkylbenzene sulfonate and 0.4 percent of the nonionic surfactant followed by 2 pore volumes of water followed by four cycles of alternating gas water injection, 20 pore volume percent gas, air being used as the gas, and from 20 to 50 pore volumes percent of water for the water slugs between air slugs resulted in a total oil recovery of 87 percent and a residual oil saturation of about 9 percent. The significant end point values are tabulated in Table I below.

TABLE I

CORE DISPLACEMENT TESTS
| | Run A |
|---|---|
| Initial Oil Saturation | 74% |
| Oil Saturation After Waterflood | 39.5% |
| % Recovery By Waterflood | 47% |
| Oil Saturation After Chemical Flood | 19% |
| % Recovery By Chemical Flood | 74% |
| Oil Saturation After Gas-Water Flood | 9.5% |
| % Recovery By Gas-Water Flood | 87.5% |

It can be seen that the total oil recovery was increased from 74 to 87.5 percent, a net increase of 18.2 percent in oil recovery as a result of the gas-water injection after completion of the chemical flood.

In order to compare the effect of continuing water injection after chemical flood to a high water-oil ratio the following pair of experiments were performed on a core taken from the Aux Vases formation, Salem Field, Marion County, Illinois. After waterflooding to a water-oil ratio of 100:1, two tertiary displacements were performed. In Run B, a surfactant slug of 0.4 percent linear alkylbenzene sulfonate and 0.4 percent polyethoxylated alkylphenol was injected and then water was injected continually until the water-oil ratio was quite high, followed by a slug of gas and water. In Run C, the same procedure was used except the step of waterflooding to a high water-oil ratio after chemical flooding was omitted. The results are given in Table II below.

TABLE II

DISPLACEMENT RESULTS
| | Run B | Run C |
|---|---|---|
| Initial Oil Saturation | 54.5 | 51.2 |
| Oil Saturation After Waterflood | 24.3 | 23.2 |
| % Recovery By Waterflood | 55.4 | 54.7 |
| Oil Saturation After Chemical Flood | 23.8 | 21.9 |
| % Recovery By Chemical Flood | 56.3 | 57.2 |
| Oil Saturation After Second Waterflood | 23.5 | — |
| % Recovery By Second Waterflood | 56.7 | — |
| Oil Saturation After Gas-Water Slug | 13.0 | 10.0 |
| % Recovery After Gas-Water Slug | 76.0 | 80.0 |

Several important observations may be made from the above data. Continuation of water injection after chemical flood to a very high water-oil ratio value was somewhat ineffective. Injection of gas-water slugs soon after completion of the chemical flood is much more effective than continuing waterflooding to a high water-oil ratio. Also, even if waterflooding to a high water-oil ratio is utilized, considerable additional oil can be recovered by initiating gas-water injection after the waterflood.

In Run D, a core was subjected to a commercial waterflood employing a preflush with salinity optimization and containing sacrificial adsorption agents followed by an aqueous solution of petroleum sulfonate followed by an aqueous solution of a hydrophilic polymer for mobility control followed by waterflooding to a high water-oil ratio. A slug of nitrogen was then introduced and the core was again waterflooded.

TABLE III

CORE DISPLACEMENT RESULTS
| | Run D |
|---|---|
| % Oil Recovery After Waterflood | 57.5 |
| Residual Oil Saturation After Waterflood | 20.8 |
| % Oil Recovery After Chemical Flood | 77.5 |
| Residual Oil Recovery After Chemical Flood | 11.0 |
| % Oil Recovery After Gas-Water Flood | 87.0 |
| Residual Oil Saturation After Gas-Water Flood | 6.4 |

It can be seen from the foregoing that considerable oil can be recovered after use of petroleum sulfonate and a polymer solution by a gas slug injection.

In still another Salem core displacement experiment, Run E was performed as before except using two different commercially available surfactants. The surfactant solution contained 1.0 percent Triton, a dioctyl sodium succinate and 0.25 percent TD-15, a polyoxyalkalene ether. The results of Run E are given in Table IV below.

TABLE IV

CORE DISPLACEMENT TESTS

| | Run E |
|---|---|
| % Oil Recovery After Waterflood | 47 |
| Residual Oil Saturation After Waterflood | 27.5 |
| % Oil Recovery After Chemical Flood | 54 |
| Residual Oil Saturation After Chemical Flood | 24 |
| % Oil Recovery After Gas Slug | 74 |
| Residual Oil Saturation After Gas Slug | 13 |

It can be seen that in Run E, the gas water slug had a more pronounced effect on oil recovery than did the chemical flood.

Two additional runs were made to compare a commercial chemical tertiary flood, Run F, comprising sacrificial agent preflush, petroleum sulfonate, hydrophilic polymer and waterflood to a high water-oil ratio, to a Run G which is essentially the same as Run F except that the hydrophilic polymer solution is not used and in its place is used a cycle of nitrogen-water slugs. Tests were conducted in a linear Benoist Sandstone core having 20.4 percent porosity and permeability of 176 millidarcies. The data are given In Table V below.

TABLE V

CORE DISPLACEMENT TESTS

| | Run F | Run G |
|---|---|---|
| % Oil Recovery After Waterflood | 48.5 | 44.5 |
| Residual Oil Saturation After Waterflood | 34.5 | 36.0 |
| % Oil Recovery After Chemical Flood | 76.6 | — |
| Residual Oil Saturation AFter Chemical Flood | 15.5 | — |
| % Oil Recovery After Gas-Water Flood | — | 85.5 |
| Residual Oil Saturation After Gas-Water Flood | — | 9.4 |

It can be seen that the surfactant-gas-water injection recovered 85.5 percent of the original oil compared to 74 percent for the conventional surfactant polymer flood, which amounts to a 15.5 percent improvement thereover.

Thus I have disclosed and demonstrated that by the use of at least one and preferably a plurality of small slugs of gas separated by water slugs, injected after a surfactant containing solution has been injected into a formation, the final oil recovery is increased materially, the residual oil saturation is reduced correspondingly, the amount of surfactant required is reduced, and the need for a solution of hydrophilic polymer containing, mobility buffer solution can at least in some instances be eliminated. While several explanations have been offered for the mechanisms responsible for the benefits resulting from the practice of my invention, I do not intend that I be bound thereby and I do not hereby represent that these are the only or even the major mechanisms responsible for the benefits attained by the practice of the process of my invention. Similarly, while several illustrative embodiments have been disclosed herein, my invention is not so limited, as many more variations thereover will be apparent to persons skilled in the related arts without departing from the true spirit and scope of my invention, and therefore it is my intention that my invention be limited and restricted only by those limitations and restrictions which are contained in the claims appended hereinafter.

I claim:

1. In a method for recovering petroleum from a subterranean, petroleum containing, porous formation penetrated by at least one injection well and at least one production well, both wells being in fluid communication with the formation, said recovery method being of the type wherein an aqueous surfactant solution is injected into the formation and an aqueous solution of hydrophilic, viscosity increasing polymer is injected into the formation following the surfactant solution and oil displaced by the injected fluids is recovered from the formation via the production well, wherein the improvement comprises:
   a. injecting from about 2 to about 8 slugs of gas the volume of which is from about 0.2 to about 20.0 pore volume percent with a slug of from about 5 to about 50 pore volume percent water injected between succeeding gas slugs into the formation after injection of the solution of the hydrophilic viscosity increasing polymer; and
   b. injecting water into the formation after injection of all of the slugs of gas to displace the gas, surfactant solution and solution of hydrophilic viscosity increasing buffer and formation petroleum toward the production well.

2. A method as recited in claim 1 wherein the gas injected into the formation is selected from the group consisting of air, nitrogen, carbon dioxide, flue gas, engine exhaust gas, methane, ethane, propane, butane, ethylene, propylene, butylene, natural gas, liquefied petroleum gas, and mixtures thereof.

3. A method as recited in claim 2 wherein the gas is air.

4. A method as recited in claim 2 wherein the gas is nitrogen.

5. A method as recited in claim 2 wherein the gas is carbon dioxide.

6. A method as recited in claim 2 wherein the gas is methane.

7. A method as recited in claim 2 wherein the gas is natural gas.

8. A method as recited in claim 2 wherein the gas is liquefied petroleum gas.

9. In a method of recovering petroleum from a subterranean, porous, petroleum containing formation penetrated by at least one injection well having at least two separate injection paths from the surface of the earth to the petroleum containing formation, one being in fluid communication with the upper portion of the formation and one being in fluid communication with the lower portion of the formation, and at least one production well, said recovery method being of the type wherein a surfactant containing recovery fluid is injected into the formation via the injection well and fluids including formation petroleum are recovered from the production well, the improvement which comprises:
   simultaneously injecting into the formation, gas via the injection path in fluid communication with the lower portion of the formation and water via the injection path in fluid communication with the upper portion of the formation, both the gas and water being injected after injection of the surfactant containing fluid is completed, the ratio of gas volume flow rate to water flow rate being from about 0.002 to about 1.5, said gas being selected from the group consisting of air, nitrogen, carbon dioxide, flue gas, exhaust gas, methane, ethane, propane, butane, ethylene, propylene, butylene, natural gas, liquefied petroleum gas, and mixtures thereof.

* * * * *